United States Patent
Hasegawa et al.

(10) Patent No.: US 8,047,835 B2
(45) Date of Patent: Nov. 1, 2011

(54) METHOD OF TRANSCRIBING FINE PATTERN AND FINE STRUCTURE PATTERN TRANSCRIPTION APPARATUS

(75) Inventors: Mitsuru Hasegawa, Ibaraki (JP); Masahiko Ogino, Ibaraki (JP); Takashi Ando, Ibaraki (JP); Hideaki Kataho, Ibaraki (JP)

(73) Assignee: Hitachi High-Technologies Corporation, Tokyo (JP)

(*) Notice: Subject to any disclaimer, the term of this patent is extended or adjusted under 35 U.S.C. 154(b) by 832 days.

(21) Appl. No.: 11/736,016

(22) Filed: Apr. 17, 2007

(65) Prior Publication Data

US 2007/0243281 A1    Oct. 18, 2007

(30) Foreign Application Priority Data

Apr. 18, 2006 (JP) ................... 2006-113963

(51) Int. Cl.
*B29C 43/02* (2006.01)
*B29C 35/08* (2006.01)

(52) U.S. Cl. ............... 425/405.1; 425/385; 425/387.1; 264/293

(58) Field of Classification Search ............... 425/405.1, 425/387.1, 385; 264/293
See application file for complete search history.

(56) References Cited

U.S. PATENT DOCUMENTS

| | | | | |
|---|---|---|---|---|
| 5,249,949 A | * | 10/1993 | Aslam et al. | 425/385 |
| 5,308,235 A | * | 5/1994 | Kamitakahara et al. | 425/194 |
| 5,320,514 A | * | 6/1994 | Kanome et al. | 425/194 |
| 6,071,110 A | * | 6/2000 | Mikkelsen | 425/327 |
| 6,074,192 A | * | 6/2000 | Mikkelsen | 425/327 |
| 6,482,742 B1 | | 11/2002 | Chou | |
| 6,696,220 B2 | | 2/2004 | Bailey et al. | |
| 7,144,539 B2 | * | 12/2006 | Olsson | 264/293 |
| 7,252,777 B2 | * | 8/2007 | Vidusek et al. | 216/54 |
| 7,296,519 B2 | * | 11/2007 | Dona et al. | 101/486 |
| 7,347,683 B2 | * | 3/2008 | Seki et al. | 425/182 |
| 7,635,263 B2 | * | 12/2009 | Cherala et al. | 425/385 |
| 7,636,999 B2 | * | 12/2009 | Choi et al. | 29/559 |

(Continued)

FOREIGN PATENT DOCUMENTS

JP        2003-157520        5/2003

(Continued)

OTHER PUBLICATIONS

"MEMS Exchange" Aluminum Nitride, www.memsnet.org/material/alumnitridealnbulk.*

(Continued)

*Primary Examiner* — Joseph Del Sole
*Assistant Examiner* — Nahida Sultana
(74) *Attorney, Agent, or Firm* — Antonelli, Terry, Stout & Kraus, LLP.

(57) ABSTRACT

A method of transcribing a shape of a surface of a stamper on a transcription surface of a transcription object by pressing the stamper on the transcription object, which comprises steps of: having one of the stamper and the transcription object positioned opposite a plate surface and the other of the stamper and the transcription object placed on one surface of a pressure plate; and having the one of the stamper and the transcription object pressed onto the plate surface by applying a fluid on the other surface of the pressure plate, wherein an area of the one surface of the pressure plate is larger than a contact area in which the other of the stamper and the transcription object is in contact with the pressure plate.

6 Claims, 6 Drawing Sheets

U.S. PATENT DOCUMENTS

| | | | |
|---|---|---|---|
| 7,815,424 B2 * | 10/2010 | Nakamura et al. | 425/150 |
| 2003/0189273 A1 | 10/2003 | Olsson | |
| 2005/0023269 A1 * | 2/2005 | Hiramatsu et al. | 264/293 |
| 2005/0184436 A1 * | 8/2005 | Jeong et al. | 264/496 |
| 2010/0059904 A1 * | 3/2010 | Kasumi | 264/293 |
| 2010/0239889 A1 * | 9/2010 | Uchida et al. | 428/826 |
| 2011/0014314 A1 * | 1/2011 | Babbs et al. | 425/385 |
| 2011/0024948 A1 * | 2/2011 | Takaya et al. | 264/293 |
| 2011/0045185 A1 * | 2/2011 | Lindner et al. | 427/271 |

FOREIGN PATENT DOCUMENTS

| | | |
|---|---|---|
| JP | 2003-516644 | 5/2003 |
| WO | WO 01/42858 A1 | 6/2001 |
| WO | WO 03/001210 A2 | 1/2003 |

OTHER PUBLICATIONS

New World Encyclopeida, Silicon, http://www.newworldencyclopedia.org/entry/Organic_compound.*

Japanese Office Action mailed Jun. 7, 2011, in connection with Japanese Patent Application No. 2006-113963, 3 pages, Japanese Patent Office, Japan.

* cited by examiner

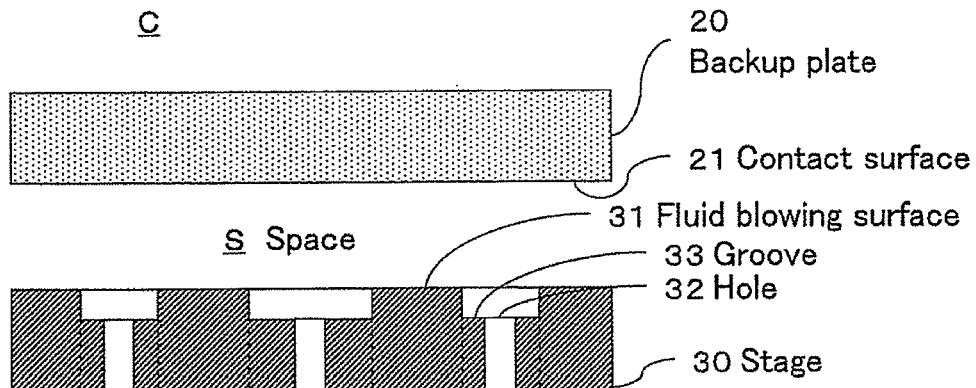
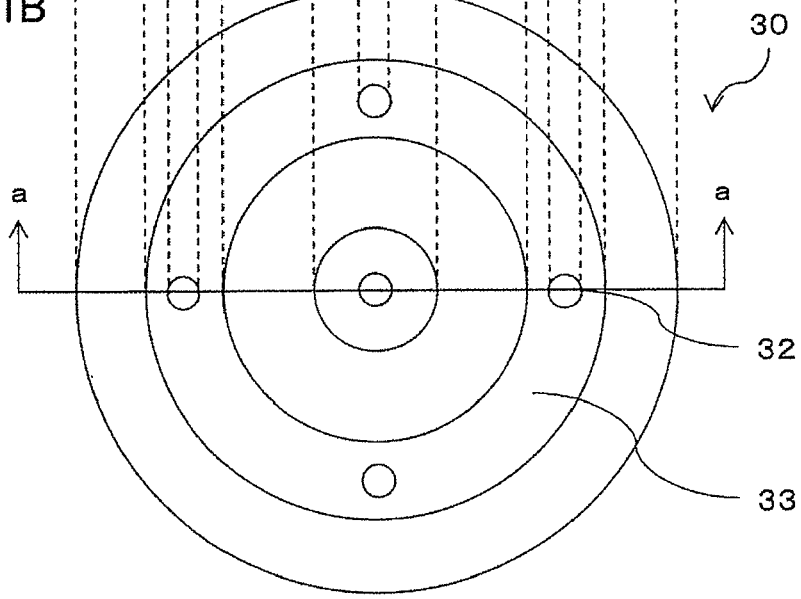
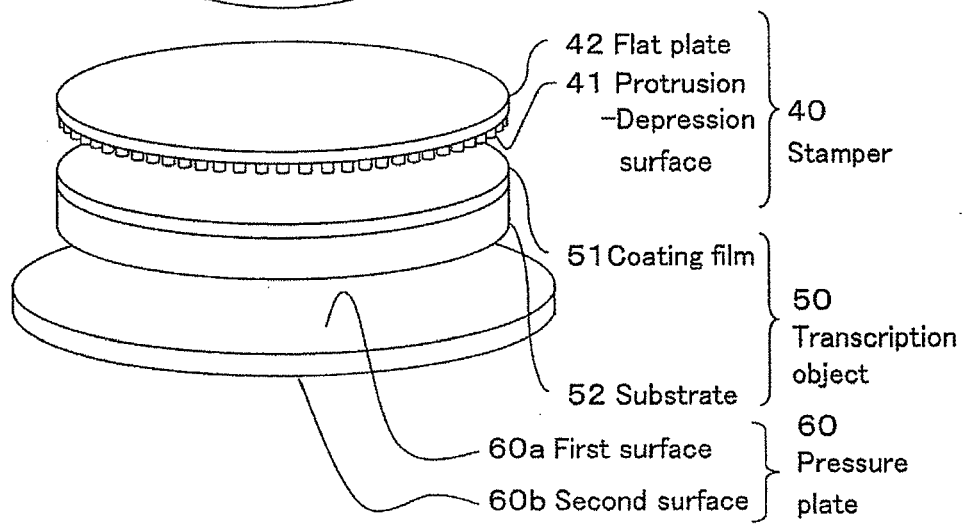

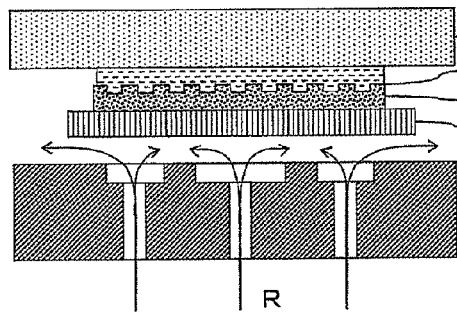
FIG.3A <Embodiment>
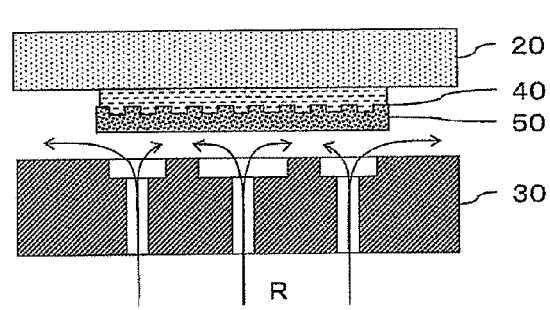
FIG.3B <Comparative example>
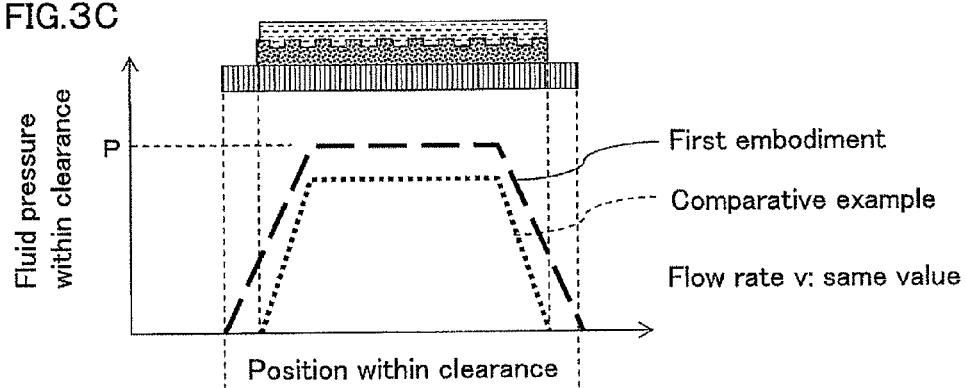
FIG.3C
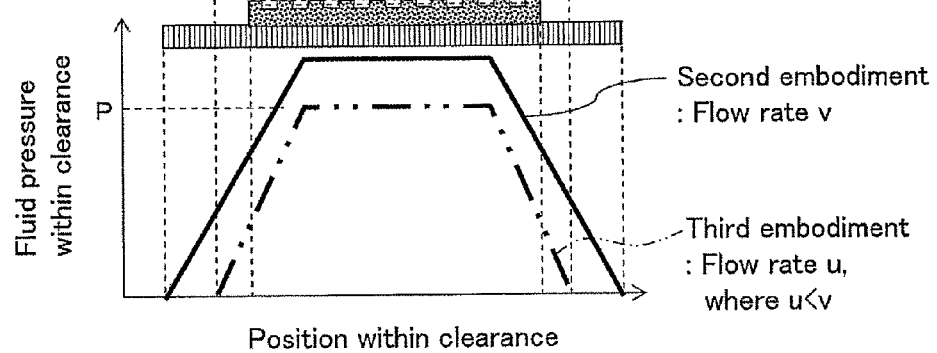
FIG.3D

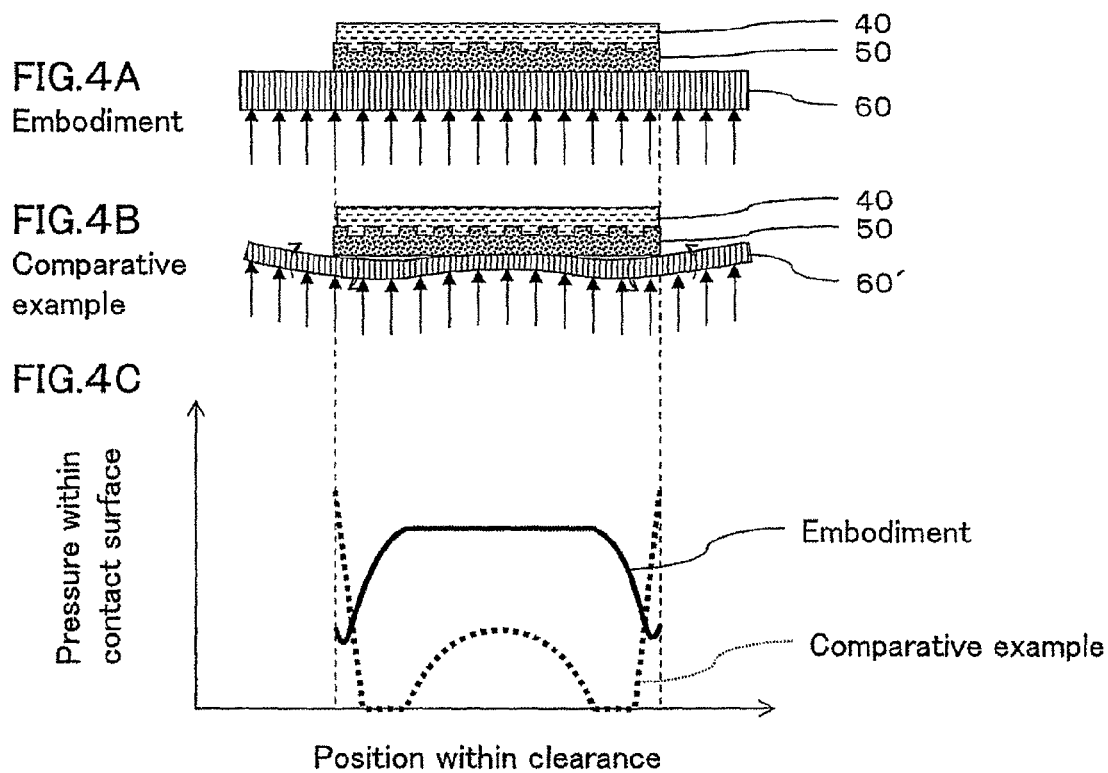

METHOD OF TRANSCRIBING FINE PATTERN AND FINE STRUCTURE PATTERN TRANSCRIPTION APPARATUS

CROSS REFERENCE TO RELATED APPLICATIONS

This application claims the foreign priority benefit under Title 35, United States Code, §119(a)-(d) of Japanese Patent Application No. 2006-113963, filed on Apr. 18, 2006, the contents of which are hereby incorporated by reference.

BACKGROUND OF THE INVENTION

1. Field of the Invention

The present invention relates to a technology of fine structure pattern transcription for transcribing a fine protrusion-depression pattern on a transcription object.

2. Description of Related Art

Fine patterning and integration of a semiconductor integrated circuit have been progressed in recent years. As a result, a patterning dimension of the circuit has been shrunk as small as a light source wave length which is used for a photolithography technology. Therefore, a conventional photolithography technology is reaching to a limit as a pattern formation technology. Then, for finer and more precise patterning, an electron beam lithography apparatus, which is a kind of a charged particle beam apparatus, is considered as a pattern formation technology instead of the photolithography technology.

However, a pattern formation method of the electron beam lithography apparatus is a direct drawing method of a mask pattern, which is different from a pattern formation method of a one-shot exposure method using a light source such as i-line and an excimer laser. Therefore, in the pattern formation method using the electron beam lithography apparatus, an exposure time (drawing time) increases according to a writing length of a pattern. Accordingly, a long time is required for completing the pattern.

Therefore, in proportion to a degree of integration of a semiconductor integrated circuit, a time required for the pattern formation increases, thereby resulting in reduction of a throughput. Then, for speeding up the electron beam lithography apparatus, a technology of one-shot drawing radiation method is considered, in which various shapes of masks are combined and the electron beam is irradiated with one-shot for diffusing a shape of the beam. However, since a degree of requirement for fine patterning has progressed, there are many factors which raise a fabrication cost, for example, growing in size of the electron beam apparatus and increase in mask alignment.

Under conditions described above, recently, an imprint technology has gotten a lot of attention as a technology for forming a fine pattern at low cost. The imprint technology prepares a stamper in advance which has a protrusion-depression pattern which is identical to a pattern to be formed on a surface of a substrate using, for example, a photolithography technology or an electron beam lithography apparatus. The technology has a simple procedure for transcribing a predetermined pattern, that is, the stamper is pressed on a resist film which is coated on a surface of a transcription substrate, then separated.

An electron beam lithography apparatus is required for fabricating a stamper. However, by using the stamper as a master, a plurality of replicas are fabricated. As a result, a total cost can be reduced by using the replicas for an actual pattern transcription. The imprint technology is being studied to apply to, for example, a formation of a memory bit of a large volume storage medium, as well as a pattern formation of a semiconductor integrated circuit.

In the imprint technology, a pressure of a stamper which is pressed on a surface of a pattern transcription region is required to be uniform for precisely transcribing a fine pattern on a transcription substrate such as a substrate for a semiconductor integrated circuit and a large volume storage medium.

For example, a transcription technology is disclosed in U.S. Pat. No. 6,696,220, in which a stamper is mechanically pressed on a part of a surface of a transcription substrate to form a fine pattern. However, since the surface of the transcription substrate has fine waves, it becomes difficult to make a surface of the stamper to follow the fine waves of the transcription substrate, especially, when the pattern transcription region becomes large.

As a technology for uniformly pressing a large transcription substrate which has the fine waves on its surface, for example, a technology is disclosed in Japanese Laid-Open Patent Publication No. 2003-157520, in which an applied pressure is uniformed by inserting a pressure buffer layer between a stamper or transcription substrate and a press head. In addition, in US Laid-Open Patent Publication No. 0189273 in 2003, a technology is disclosed, in which a room for encapsulating a fluid instead of the pressure buffer layer is disposed behind a stamper or transcription substrate. Further, in U.S. Pat. No. 6,482,742, a technology is disclosed, in which a stamper and a transcription substrate are arranged in a chamber whose pressure is adjustable, and a uniform pressure is applied to the stamper and the transcription substrate as a whole by encapsulating a fluid, for example, a gas in the chamber. As a result, a fine pattern can be formed on a wafer of up to 200 mm in diameter.

In the conventional technology, a control of in-plane stress distribution corresponding to a surface status and an outer shape of a stamper and a transcription substrate has been difficult.

As a method for solving the above issues, a method which gives an in-plane stress distribution is considered, in which a stage is disposed keeping a clearance at a position close to a surface of a stamper and a transcription substrate, and a fluid is blown out in the space from a predetermined position of the stage.

However, in the method described above, since a space which expands around the stamper and the transcription substrate is extremely large compared with a space between the transcription substrate and the stage, a stress distribution in the space which is obtained by blowing out a fluid in the narrow space rapidly decreases toward an end portion of the stamper and the transcription substrate.

This causes an insufficient pressure in the vicinity of the end portion of the stamper and the transcription substrate, thereby resulting in generation of a new problem such as a pattern transcription failure and a reduction of an effective transcription area.

Therefore, it is desirable to provide a fine structure pattern transcription method and a fine structure pattern transcription apparatus which can prevent a pressure, which is required for pressing a stamper on a surface of a transcription substrate, from dropping in an end portion of the stamper.

SUMMARY OF THE INVENTION

According to a first aspect of the present invention, there is provided a fine structure pattern transcription method of transcribing a shape of a protrusion-depression surface on a transcription surface of a transcription object by pressing a stamper which has the protrusion-depression surface on the transcription object. The transcription method includes the step of: facing one member of the stamper and the transcription object to a contact surface keeping the protrusion-depression surface and the transcription surface contacted each other, while making the other member of the stamper and the transcription object to come in contact with a first surface of a pressure plate; making the one member to come in contact with the contact surface which faces the one member by blowing out a fluid on a second surface opposite to the first surface of the pressure plate, wherein a dimension of the first surface is formed larger than a contact dimension which comes in contact with the other member.

Configuring the invention as described above, a pressure, which is applied by the fluid to a backside of an area corresponding to the contact area of the pressure plate, is prevented from dropping in the vicinity of end portion of the contact area.

In the present invention, since a pressure which is required to press a stamper on a surface of a transcription object is not dropped in an end portion of the stamper, a pattern transcription failure and a reduction of a transcription area can be prevented.

BRIEF DESCRIPTION OF THE DRAWINGS

FIG. 1A is a cross sectional view showing a part of a fine structure pattern transcription apparatus according to a first embodiment of the present invention;

FIG. 1B is a plane view showing an upper surface of a stage of the fine structure pattern transcription apparatus;

FIG. 1C is a perspective view showing a pressure plate which is a part of the fine structure pattern transcription apparatus according to the first embodiment, and a transcription object and a stamper to be placed on the pressure plate;

FIG. 3A is an illustration for explaining an operation of a pressure plate to be applied to the present invention, where the pressure plate is actually applied;

FIG. 3B is an illustration for explaining the operation of the pressure plate to be applied to the present invention, where the pressure plate is not applied. This is shown as a comparative example;

FIG. 3C is an illustration for explaining the operation of the pressure plate to be applied to the present invention, where a pressure distribution of a fluid in a clearance is shown;

FIG. 3D is an illustration for explaining the operation of the pressure plate to be applied to the present invention, where an effect of the pressure plate is shown when a dimension of the pressure plate becomes large;

FIG. 4A is an illustration for explaining an effect of a pressure plate with a high rigidity to be applied to the present invention, where the rigidity of the pressure plate is actually high;

FIG. 4B is an illustration for explaining the effect of the pressure plate with a high rigidity to be applied to the present invention, where the rigidity of the pressure plate is low;

FIG. 4C is an illustration for explaining the effect of the pressure plate with a high rigidity to be applied to the present invention, where a stress distribution in a contact surface with respect to a position within a clearance is shown by comparing the embodiment and a comparative example;

DETAILED DESCRIPTION OF THE PREFERRED EMBODIMENT

First Embodiment

Figure 2A:
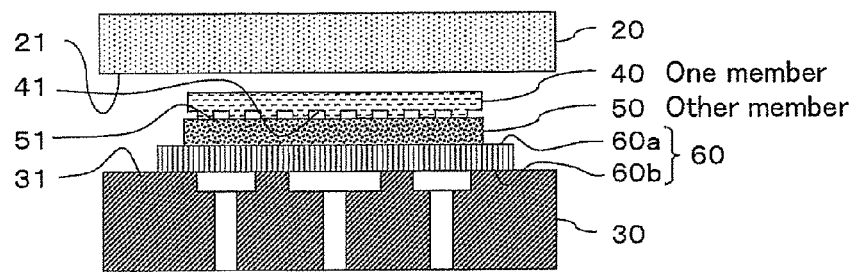
FIG. 2A is an illustration for explaining a process of a fine structure pattern transcription method according to embodiments of the present invention.

Hereinafter, a first embodiment of the present invention will be explained by referring to figures.

As a longitudinal sectional view shown in FIG. 1A, a fine structure pattern transcription apparatus 10 according to the first embodiment includes a backup plate 20 which has a contact surface 21 and a stage 30 which has a fluid blowing surface 31 within an inner space C of a chamber. In a space S which is formed between the backup plate 20 and the stage 30, a stamper 40, a transcription object 50, and a pressure plate 60 shown in FIG. 1C are arranged.

The fine structure pattern transcription apparatus 10 which is configured as described above transcribes a shape of a protrusion-depression surface 41 on a coating film 51 (transcription surface) which is formed on a surface of the transcription object 50 by pressing the stamper 40 which has a protrusion 41 (protrusion-depression surface) on the transcription object 50.

The backup plate 20 has the contact surface 21 which comes in contact with an upper surface of a "one member" (stamper 40 in FIG. 1A to 1C) which is selected from the stamper 40 and the transcription object 50. The backup plate 20 is arranged above the stage 30 including the space S therebetween. In addition, the backup plate 20 is provided with a system (not shown) for adjusting an inclination so that the contact surface 21 becomes parallel to the fluid blowing surface 31 of the stage 30.

Figure 2B:
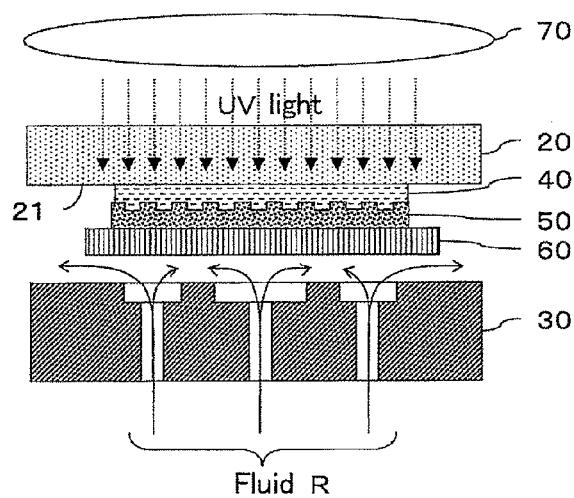
FIG. 2B is an illustration for explaining the process of the fine structure pattern transcription method, where a light curable thin resin film is coated on a transcription surface.

When the transcription surface (coating film 51) of the transcription object 50 is formed by a light curable thin resin layer, the backup plate 20 is configured with a material such as quartz which is transparent to a light (for example, UV light: ultraviolet light) which cures the thin resin layer. In this case, a light source 70 of the light which transmits the backup plate 20 is arranged above the backup plate 20 (see FIG. 2B)

In addition, when the transcription surface (coating film 51) of the transcription object 50 is formed by a thermoplastic thin resin layer, it is preferable that the backup plate 20 is configured with a thermal conductive material which plasticizes the thin resin layer. In this case, a heat source 80 which heats the backup plate 20 is disposed in a part of the backup plate 20 (see FIG. 2C). It is preferable that the heat source 80 is configured and arranged so that a temperature distribution on a bottom surface of the backup plate 20 becomes uniform.

As shown in FIG. 1B, a plurality of through-holes 32 are disposed in the stage 30, and a groove 33 which circularly communicates with opening portions of the through-holes 32 is disposed on the fluid blowing surface 31. Openings opposite to the through-holes 32 are connected to a fluid supplying unit, which is not shown. The fluid supplying unit can increase and decrease a pressure of the fluid. Therefore, it is possible to blow out the fluid from the through-holes 32, or to vacuum-contact a member. The fluid blowing surface 31 which is configured as described above can lift up the pressure plate 60 by blowing out the fluid toward a second surface 60b of the pressure plate 60, as well as places the pressure plate 60. It is noted that although not shown, a transfer unit for transferring the stage 30 in horizontal and vertical directions is provided below the stage 30.

In the inner space C of the chamber, a transfer unit (not shown) for transferring the backup plate 20 which adjusts a distance of the space S and a fluid supplying unit (not shown) for supplying the fluid which is blown out from the fluid blowing surface 31 are arranged.

The stamper 40 includes a plurality of protrusions 41 (protrusion-depression surface) which are arranged on one side of a flat plate 42 to form a fine structure. An opposite side of the protrusion-depression surface 41 is a smooth surface which comes in contact with the contact surface 21 of the backup plate 20 with a plane.

When the transcription surface (coating film 51) of the transcription object 50 is formed using a light curable thin resin layer, the stamper 40 is configured with a material which is transparent to a light (for example, UV light: ultraviolet light) which cures the thin resin layer. Specifically, for example, a stamper which is provided with a desired fine protrusion-depression pattern on a surface of a quartz substrate using electron beam lithography is used.

When the transcription surface (coating film 51) of the transcription object 50 is formed using a thermoplastic thin resin layer, it is preferable that the backup plate 20 is configured with a thermal conductive material which plasticizes the thin resin layer.

The protrusion-depression surface 41 of the stamper 40 is exemplified by a plurality of protrusions. However, the protrusion-depression surface 41 is not limited to the above. For example, a protrusion-depression surface where a plurality of holes are regularly arranged may be included in the present invention.

In the transcription object 50, the coating film 51, which is a transcription surface, is coated on one surface of a substrate 52 which has two smooth surfaces parallel to each other. A silicon substrate, for example, may be used as a substrate 52.

In addition, the coating film 51 plastically flows according to a shape of the protrusion-depression surface 41 of the stamper 40 when the protrusion-depression surface 41 is pressed, while the coating film 51 is hardened keeping the shape by implementing a predetermined treatment. Further, it is required that the protrusion-depression surface 41 is easily separated from the coating film 51 even when the coating film 51 is hardened being pressed on the protrusion-depression surface 41. Specifically, the coating film 51 may be a light curable thin resin film which is hardened by a UV light irradiation, or may be a thermoplastic thin resin film which is softened by a heat treatment and hardened by cooling.

In the pressure plate 60, a dimension of a first surface 60a of the pressure plate 60 is formed larger than a contact dimension of the "other object" (transcription object 50 in FIG. 1C), which is selected from the stamper 40 and transcription object 50, which comes in contact with the first surface 60a of the pressure plate 60. The pressure plate 60 which is configured as described above places the stamper 40 and transcription object 50 on the first surface 60a under conditions that the protrusion-depression surface 41 and the transcription surface 51 are contacted each other. Then, the pressure plate 60 is lifted up by blowing out a fluid from the fluid blowing surface 31 toward a second surface 60b opposite to the first surface 60a under conditions that the stamper 40 and transcription object 50 are placed on the first surface 60a.

Since the pressure plate 60 is required to have a high rigidity due to a reason described later, the pressure plate 60 may be made using quartz.

Processes of a transcription method of a fine structure pattern according to the embodiment of the present invention will be explained by referring to FIG. 2A to FIG. 2D. First, the stamper 40, the transcription object 50, and the pressure plate 60 are prepared, then, the stamper 40 and the transcription object 50 are stacked on the pressure plate 60 so that the protrusion-depression surface 41 comes in contact with the transcription surface 51.

Next, after alignment of the stamper 40, the transcription object 50, and the pressure plate 60 using an alignment unit which is not shown, they are placed on the fluid blowing surface 31 of the stage 30 by a sample transportation unit, which is not shown. Then, a position of the stage 30 is moved so that a clearance of about dozens of micrometer is formed between the contact surface 21 of the backup plate 20 and an upper surface of the stamper 40 (see FIG. 2A).

Next, when a fluid R such as nitrogen gas is blown out toward a bottom surface of the pressure plate 60 from the fluid blowing surface 31 of the stage 30, the stamper 40, the transcription object 50, and the pressure plate 60 are lifted up together, and the upper surface of the stamper 40 is kept contacted with the contact surface 21 of the backup plate 20. In this time, the thin resin film of the transcription surface 51 of the transcription object 50 is pressed against the protrusion-depression surface 41 of the stamper 40 and flows into a whole protrusion-depression pattern to fill the protrusion-depression pattern (see FIG. 2B, FIG. 2C).

When the transcription surface 51 of the transcription object 50 is formed using a light curable thin resin film, a UV light is irradiated on the transcription surface 51 from a light source 70 which is set above the backup plate 20 and used for ultraviolet light irradiation under conditions that the protrusion-depression surface 41 is kept pressed on the transcription surface 51. Accordingly, the UV light is irradiated on the transcription surface 51 of the transcription object 50 through the backup plate 20 and the stamper 40 to expose the transcription surface 51, thereby resulting in hardening of the transcription surface 51 (see FIG. 2B).

Figure 2C:
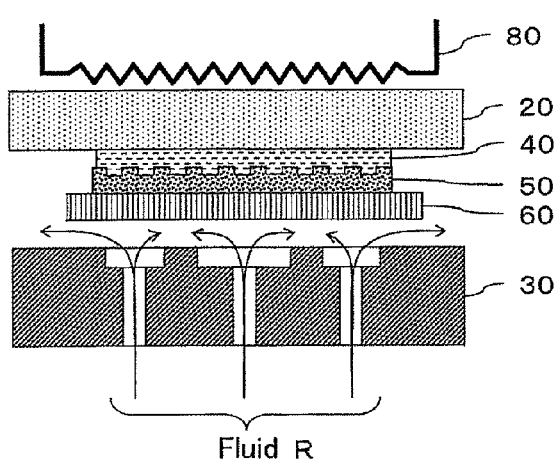
FIG. 2C is an illustration for explaining the process of the fine structure pattern transcription method, where a thermoplastic thin resin film is coated on a transcription surface.
Figure 2D:
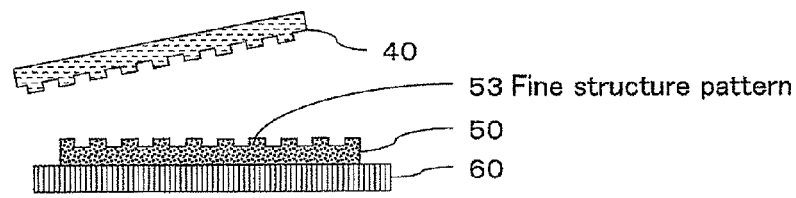
FIG. 2D is an illustration for explaining the process of the fine structure pattern transcription method according to the embodiments of the present invention.

On the other hand, when the transcription surface 51 of the transcription object 50 is formed using a thermoplastic thin resin film, the backup plate 20 which is heat-treated by a heat source 80 is cooled to harden the transcription surface 51 of the transcription object 50 under conditions that the protrusion-depression surface 41 is kept pressed on the transcription surface 51 (see FIG. 2C).

As described above, when the blowing of the fluid R from the fluid blowing surface 31 is stopped after hardening the thin resin film of the transcription surface 51 of the transcription object 50, lifting up of the stamper 40, the transcription object 50, and the pressure plate 60 is stopped and they are placed on the stage 30.

Subsequently, the stamper 40 and the transcription object 50 are taken out keeping stacked each other, and separated using a separation unit, which is not shown. Accordingly, the transcription object 50 having a fine structure pattern 53 on a surface of the transcription object 50 can be obtained (see FIG. 2D).

An operation of the pressure plate 60 which is applied to the present invention will be explained by referring to FIG. 3A to FIG. 3D. First, FIG. 3A shows an embodiment which employs the pressure plate 60. FIG. 3B shows a comparative example which does not employ the pressure plate 60. Both figures show a status that the stamper 40 and the transcription object 50 are lifted up by blowing out the fluid R from an upper surface of the stage 30. It is noted that in FIG. 3A and FIG. 3B, a distance between the backup plate 20 and the stage 30 is controlled so that a clearance which is formed when the fluid R is blown out becomes equal in both cases.

FIG. 3C shows the followings. Under conditions that a flow rate v of the fluid R is fixed to be constant, a dashed line indicates an analysis result of a relation, which is obtained using a fluid analysis program, between a fluid pressure and a horizontal surface position of a clearance which is formed between the stage 30 and the pressure plate 60 shown in FIG. 3A, and a dotted line indicates an analysis result of a relation, which is obtained using a fluid analysis program, between a fluid pressure and a horizontal surface position of a clearance which is formed between the stage 30 and the transcription object 50 shown in FIG. 3B. It is noted that a distortion of each of the configuration members due to a pressure applied to the clearance is not considered.

As shown in a graph of FIG. 3C, in both cases, that is, in a case where the pressure plate 60 exists (first embodiment) and a case where the pressure plate 60 does not exist (comparative example), a pressure proportional to a blown out rate of the fluid R is applied to a position close to a horizontal surface center in the clearance where the fluid R is blown out, however, at an end portion of the clearance, the pressure applied to the clearance rapidly decreases because an extremely large space relative to the clearance extends outside the clearance.

From a comparison between the first embodiment in FIG. 3C and a result of the comparative example, it is found that when a distance of the clearance and a flow rate v are same, the pressure of the fluid R increases in the whole clearance by employing the pressure plate 60 which is larger in horizontal direction. Accordingly, it is found that an area where a sufficient pressure can be applied increases by employing the pressure plate 60.

When a pattern transcription is implemented as with the comparative example shown in FIG. 3B under conditions that a pressure distribution of a fluid in a clearance is as described above, since a pressure of the fluid in an area close to an end portion of the transcription object 50 substantially decreases, a pattern transcription failure and a reduction of an effective transcription area are caused due to an insufficient pressure between the transcription object 50 and the stamper 40.

On the other hand, as shown in the embodiment in FIG. 3A, when a pattern transcription is implemented by employing the pressure plate 60, the pattern transcription failure and the reduction of the effective transcription area can be prevented because the pressure does not decrease even in the area close to the end portion of the transcription object 50.

Next, an effect of a horizontal surface dimension of the pressure plate 60, which is applied to the present invention, will be explained by referring to FIG. 3D. In FIG. 3D, the horizontal surface dimension of the pressure plate 60 is increased, compared with the case shown in FIG. 3C.

FIG. 3D shows an analysis result of a relation, which is obtained using a fluid analysis program, between a fluid pressure and a horizontal surface position of a clearance which is formed between the stage 30 and the pressure plate 60. In FIG. 3D, a solid line indicates a result of a case where a flow rate of a fluid is v which is equal to the embodiment shown in FIG. 3C, and a dashed-two dotted line indicates a result of a case where the flow rate of the fluid is u which is a value reduced from v so that a pressure of the fluid becomes P which is equal to the embodiment shown in FIG. 3C. It is noted that as with the case in FIG. 3C, a distortion of each of the members due to a pressure applied to the clearance is not considered.

By comparing the result of the second embodiment shown with the solid line in FIG. 3D with that of the first embodiment shown with the dotted line in FIG. 3C, it is found that a pressure of the fluid relatively increases in the whole clearance by increasing a dimension of the pressure plate 60 in a plane direction. As a result, an area where a sufficient pressure can be applied increases due to increase in the dimension of the pressure plate 60 in the plane direction.

Next, by comparing the result of the second embodiment shown with the solid line in FIG. 3D with that of the third embodiment shown with the dashed two-dotted line in FIG. 3D, it is found that a pressure of the fluid relatively decreases in the whole clearance by reducing the flow rate of the fluid. However, by comparing the dashed two-dotted line in FIG. 3D with the first comparative example shown with the dotted line in FIG. 3C, it is found that a pressure decrease in the end portion can be suppressed by increasing the dimension of the pressure plate in the plane direction.

An effect of a high rigidity of the pressure plate 60 to be applied to the present invention will be explained by referring to FIG. 4A to FIG. 4C.

An embodiment shown in FIG. 4A is a case where the pressure plate 60 has a high rigidity, and a comparative example shown in FIG. 4B is a case where the pressure plate 60' has a low rigidity.

FIG. 4C shows an analysis result, which is obtained using a structural analysis program, of a pressure distribution of a pressure applied to a contact surface between the transcription object 50 and the pressure plates 60, 60' which are distorted by the pressure, assuming that bottom surfaces of the pressure plates 60, 60' shown in FIG. 4A and FIG. 4B receive the pressure distribution shown in FIG. 3D from the fluid. A solid line in FIG. 4C shows a result of the embodiment shown in FIG. 4A, and a dotted line shows a result of the comparative example shown in FIG. 4B As shown in the result of the comparative example in FIG. 4B, when a rigidity of the pressure plate 60' is small, even though the transcription object 50 is pressed on the stamper 40 by a pressure of the fluid which is received by the plate 60', a projected portion of the pressure plate 60' beyond the transcription object 50 distorts upward because of no counter support.

Therefore, an inner portion of the pressure plate 60' inside the end portion of the transcription object 50 is reversely pressed downward, resulting in separation of the pressure plate 60' from the transcription object 50. As a result, as shown in the result of the comparative example shown with the dotted line, a pressure in the contact surface between the transcription object 50 and the pressure plate 60' shows an extremely high value at around a supporting point in the end portion of the transcription object 50. On the contrary, a center portion of the transcription object 50 shows a low pressure value. In addition, a pressure in an intermediate portion between the center portion and the end portion is zero since the intermediate portion is a non-contact area.

As shown in the result of the embodiment in FIG. 4A, when a rigidity of the pressure plate 60 is high, the pressure plate 60 is not distorted by a pressure of a fluid, which is received on a bottom surface of the pressure plate 60. Therefore, a non-contact area between transcription object 50 and the pressure plate 60 does not exist. As a result, as shown in the result of the embodiment shown with the solid line in FIG. 4C, a pressure in the contact surface between the transcription object 50 and the pressure plate 60 only slightly decreases in the end portion. However, a wide area from the center to the end portion of the transcription object 50 shows a uniform and high value.

As described above, since it is preferable that the pressure plate 60 is not distorted by a pressure from a fluid, the pressure plate 60 which has a high rigidity is preferable.

For satisfying a requirement of high rigidity of the pressure plate 60, it is preferable to configure the pressure plate 60 with a material whose Young's modulus is larger than that of the transcription object 50 which comes in contact with the pressure plate 60. In addition, a thickness of the pressure plate 60 may be formed thicker than that of the transcription object 50 (or stamper 40) which comes in contact with the pressure plate 60 for satisfying the requirement.

Next, an effect of a thickness variation of a pressure plate to be applied to the present invention will be explained by referring to FIG. 5A to FIG. 5C.

Figure 5A:
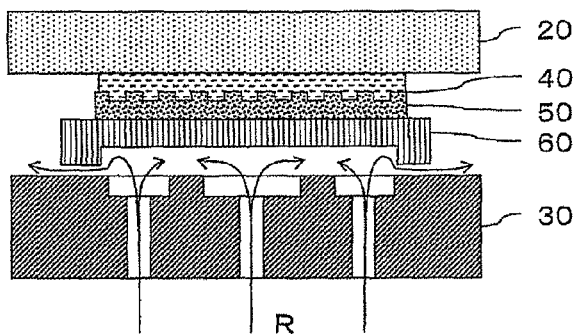
FIG. 5A is an illustration for explaining an effect of a pressure plate with a thickness variation to be applied to the present invention, where a cross section of the pressure plate according to the embodiment is shown.

In FIG. 5A, the pressure plate 60 has a thickness variation in a pressing direction of the fluid R in contrast with the above-described FIG. 3A. That is, the pressure plate 60 has a thickness variation in an outer periphery rather than a center portion so that a distance of a clearance between the outer periphery of the pressure plate 60 and the stage 30 becomes narrower. That is, the pressure plate 60 is configured such that a thickness of a portion of the pressure plate 60 where the blown out fluid R is approximately perpendicularly blown out toward the pressure plate 60 is relatively thinner than that of the periphery portion. By configuring the pressure plate 60 as described above, when the blown out fluid R flows from a thin and wide area to a thick and narrow area of the pressure plate 60, a new force which expands the narrow area upward is added.

Figure 5B:
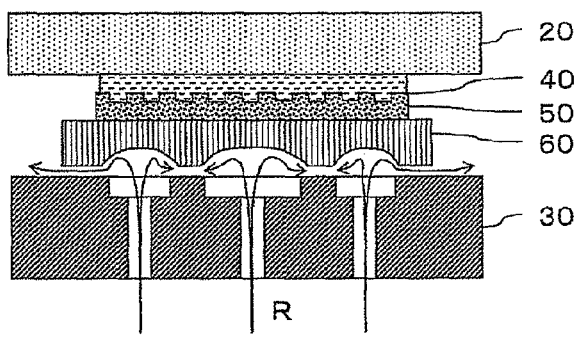
FIG. 5B is an illustration for explaining the effect of the pressure plate with a thickness variation to be applied to the present invention, where a cross section of the pressure plate according to another embodiment is shown.
Figure 5C:
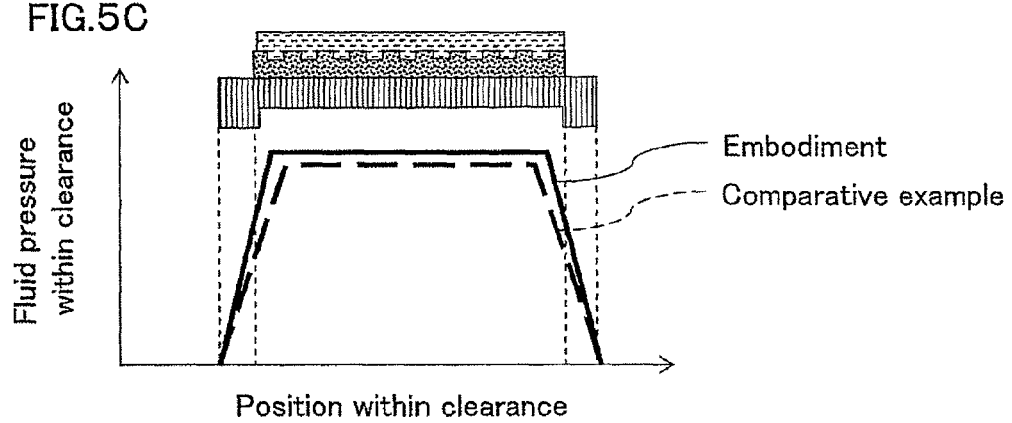
FIG. 5C is an illustration for explaining the effect of the pressure plate with a thickness variation to be applied to the present invention, where a stress distribution in a contact surface with respect to a position within a clearance is shown by comparing the embodiment and a comparative example.

FIG. 5C shows an analysis result, which is obtained using a fluid analysis program, of a relation between a fluid pressure and a position within a clearance which is formed between the stage 30 and the pressure plate 60. In FIG. 5C, a result which is obtained by a configuration of FIG. 3A with a same flow rate of the fluid is also shown with a dotted line as a comparative example. In the embodiment shown with a solid line in FIG. 5C, that is, in a case where the pressure plate 60 has a thickness variation, a whole pressure in the clearance increases, compared with the comparative example where the pressure plate 60 has no thickness variation.

From the above result, it is found that a pressure drop in the end portion of the transcription object 50 can be suppressed by giving a thickness variation to the pressure plate 60 even if a dimension of the pressure plate 60 is not increased in the horizontal direction.

Meanwhile, as another embodiment, as shown in FIG. 5B, the pressure plate 60 may be configured such that only a portion where the fluid R is blown out approximately perpendicularly toward the pressure plate 60 is formed relatively thinner, compared with a periphery of the portion. In addition, although not shown, the pressure plate 60 may also be configured, in which only a portion where the fluid R is blown out approximately perpendicularly toward the pressure plate 60 is formed relatively thicker, compared with a periphery of the portion. As described above, a pressure distribution in the clearance can be controlled by giving a thickness variation to the pressure plate 60.

In addition, in FIG. 5A and FIG. 5B, a thickness variation is given to the member itself which configures the pressure plate 60. However, although not shown, a thickness variation may be controlled by disposing a thin film which gives a thickness on a surface of the flat pressure plate 60. As described above, a position for controlling the thickness is not limited to an outer periphery of the pressure plate 60. If the effect which suppresses a pressure drop in the end portion of the transcription object 50 is obtained, the thickness control may be made in any area as needed.

In addition, in the above description, the stamper 40 is arranged on the upper side so as to come in contact with the backup plate 20 and the transcription object 50 is arranged on the lower side so as to receive a blowing out of the fluid R. However, the stamper 40 may be arranged on the lower side and the transcription object 50 may be arranged on the upper side. Further, all of the stamper 40, the transcription object 50, and the pressure plate are exemplified to have a circular horizontal surface. However, a shape of the horizontal surface is not limited.

Second Embodiment

Next, a second embodiment, in which the aforementioned pressure plate is not used, will be explained by referring to FIGS. 6A, 6B and FIGS. 7A, 7B. In a fine structure pattern transcription method according to the second embodiment, a horizontal surface dimension of a "one member", which is selected from the stamper 40 and the transcription object 50, to be arranged on the upper side (a side facing the contact surface 21) is formed smaller than that of the "other member", which is selected from the transcription object 50 and the stamper 40, to be arranged on the lower side (a side where the fluid R is blown out).

Figure 6A:
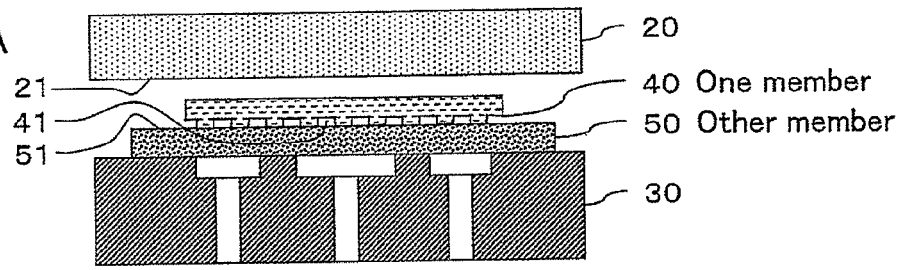
FIG. 6A is a cross sectional view of a fine structure pattern transcription apparatus according to a second embodiment of the present invention, in which a transcription object and a stamper are arranged on the downside and the upper side respectively, where a status just before blowing out a fluid is shown.
Figure 6B:
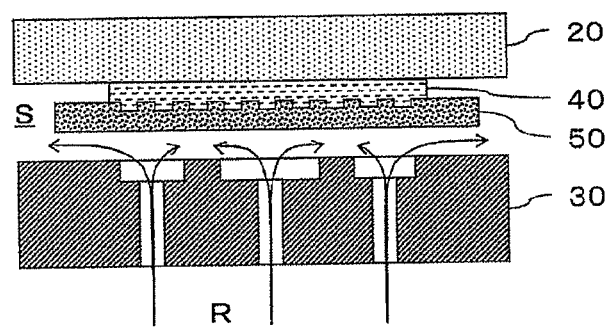
FIG. 6B is a cross sectional view of a fine structure pattern transcription apparatus according to a second embodiment of the present invention, in which a transcription object and a stamper are arranged on the downside and the upper side respectively, where a status just after blowing out a fluid is shown.
Figure 7A:
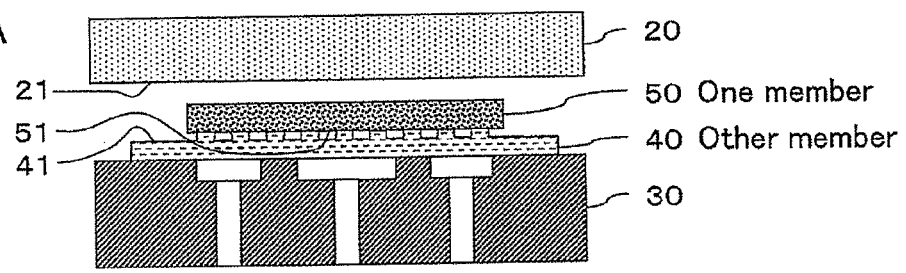
FIG. 7A is a cross sectional view of a fine structure pattern transcription apparatus according to a second embodiment of the present invention, in which a transcription object and a stamper are arranged on the upper side and the downside respectively, where a status just before blowing out a fluid is shown.
Figure 7B:
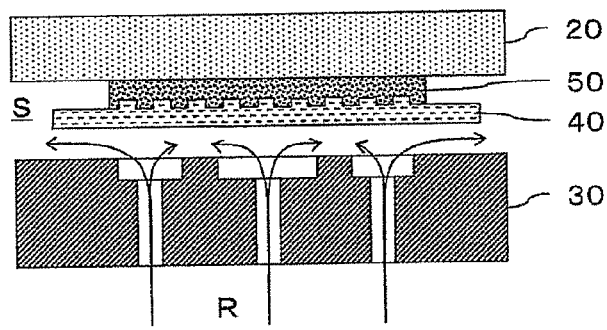
FIG. 7B is a cross sectional view of a fine structure pattern transcription apparatus according to a second embodiment of the present invention, in which a transcription object and a stamper are arranged on the upper side and the downside respectively, where a status just after blowing out a fluid is shown.

In FIG. 6A and FIG. 6B, the stamper 40 corresponds to the "one member" on the upper side and the transcription object 50, which has a relatively larger horizontal surface, corresponds to the "other member" on the lower side. In FIG. 7A and FIG. 7B, the transcription object 50 corresponds to the "one member" on the upper side and the stamper 40, which has a relatively larger horizontal surface, corresponds to the "other member" on the lower side.

FIG. 6A and FIG. 7A show that the stamper 40 and the transcription object 50 are placed on the stage 30 keeping the protrusion-depression surface 41 and the transcription surface 51 contacted each other. FIG. 6B and FIG. 7B show that the stamper 40 and the transcription object 50 are lifted up by blowing out the fluid R from the stage 30 and the "one member" on the upper side comes in contact with the contact surface 21 of the backup plate 20.

Under above conditions, since the horizontal surface of the "other member" which receives a pressure on the bottom side from the fluid is formed relatively larger than that of the "one member" which comes in contact with the backup plate 20 on the upper side, a pressure drop in the end portion of the "one member" on the upper side can be suppressed.

In addition, the "other member", which is selected from the transcription object 50 and the stamper 40, for receiving the blown out fluid can be supposed to be a member corresponding to the pressure plate 60 in the first embodiment. Therefore, it is clear that increasing a thickness of the "other member", increasing a rigidity using a material which has a large Young's modulus, and giving a thickness variation are effective methods to uniform a pressure in the contact area.

It is noted that each of the configuration members shown in FIG. 6A, FIG. 6B, FIG. 7A and FIG. 7B which is identical to that in the first embodiment is given a same symbol, and an explanation thereof will be omitted. In addition, since a process of a fine structure pattern transcription method is identical to that in the first embodiment, an explanation thereof will be omitted.

It is noted that a scope of protection of the present invention is not limited to the embodiments described above. For example, in the embodiments, the stamper 40 and the transcription object 50 is lifted up by blowing out the fluid R upward from below with respect to a vertical direction. However, a direction of blowing out the fluid R is not limited in the present invention. For example, a pressure which is required to press a stamper on a surface of a transcription object may be applied by blowing out a fluid from above to a downward direction for backing up the gravity. In addition, a pressure required to press a stamper on a surface of a transcription object may be given by blowing out the fluid R in a lateral direction with respect to the vertical direction.

Further, the "one member" which comes in contact with the contact surface 21 of the backup plate 20 may be the stamper 40 or the transcription object 50. Similarly, the "other member" which is located on the side where the fluid R is blown out may be the transcription object 50 or the stamper 40.

As described above, according to a fine structure pattern transcription method and a fine structure pattern transcription apparatus of the present invention, a pressure which is applied to the stamper 40 and the transcription object 50 is prevented from rapid dropping as a position of the stamper 40 and the transcription object 50 approaches to the end portion. Accordingly, problems of pattern transcription failure and reduction of a transcription area, which are caused by the pressure drop, can be solved.

INDUSTRIAL APPLICATION

A fine structure pattern transcription method according to the present invention is extremely effective as a fabrication method of a high functional device which requires an ultra fine structure, such as a memory bit of a large volume storage medium and a pattern of a semiconductor integrated circuit. In addition, a fine structure pattern transcription apparatus according to the present invention is effective for fabricating the high functional device.

What is claimed is:

1. A fine structure pattern transcription apparatus for transcribing a shape of a surface of a stamper on a transcription surface of a transcription object by pressing the stamper on the transcription object, the fine structure pattern transcription apparatus comprising:
a plate surface which faces one of the stamper and the transcription object;
a pressure plate having opposed first and second major surfaces, the first major surface being configured to contact the other of the stamper and the transcription object at a contact area, wherein an area of first major surface of the pressure plate is larger than the contact area; and
a fluid blowing surface configured to supply the fluid on the second major surface of the pressure plate, wherein the plate surface, the pressure plate and the fluid blowing surface are provided in an inner space of a chamber of the fine structure pattern transcription apparatus and are configured such that the fluid blown out from the fluid blowing surface flows into the inner space through a gap between the fluid blowing surface and the second major surface of the pressure plate,
wherein the pressure plate is free of holes communicating between the first and second major surfaces where the first major surface is configured to come into contact with the other of the stamper and the transcription object at the contact area.

2. The fine structure pattern transcription apparatus according to claim 1,
wherein a Young's modulus of the pressure plate is larger than a Young's modulus of one of the transcription object and the stamper which comes in contact with the pressure plate.

3. The fine structure pattern transcription apparatus according to claim 1,
wherein the pressure plate is thicker than one of the transcription object and the stamper which comes in contact with the pressure plate.

4. The fine structure pattern transcription apparatus according to claim 1,
wherein the pressure plate has a thickness variation in a pressing direction by the fluid.

5. The fine structure pattern transcription apparatus according to claim 4,
wherein a portion of the pressure plate where the fluid is approximately perpendicularly supplied toward the pressure plate is relatively thinner than a periphery of the portion.

6. The fine structure pattern transcription apparatus according to claim 4,
wherein a relatively thicker portion of the pressure plate which has a thickness variation is formed by disposing a thin film on the portion.

* * * * *